United States Patent [19]

Sartori et al.

[11] Patent Number: 5,204,431
[45] Date of Patent: Apr. 20, 1993

[54] POLYCARBOSILANES CONTAINING A HETERO ELEMENT

[75] Inventors: Peter Sartori, Rheinberg; Wolfgang Habel, Duesseldorf; Christopher Nover, Gladbeck; Baudouin van Aefferden, Duisburg; Lutz Mayer, Duisburg; Thomas Adrian, Duisburg, all of Fed. Rep. of Germany

[73] Assignee: Solvay Deutschland, GmbH, Hanover, Fed. Rep. of Germany

[21] Appl. No.: 822,730

[22] Filed: Jan. 21, 1992

[30] Foreign Application Priority Data

Jan. 26, 1991 [DE] Fed. Rep. of Germany ....... 4102315

[51] Int. Cl.$^5$ ............................................. C08G 79/08
[52] U.S. Cl. ......................................... 528/4; 528/10; 528/25; 528/43
[58] Field of Search ............... 528/43, 10, 4, 25

[56] References Cited

U.S. PATENT DOCUMENTS

| | | | |
|---|---|---|---|
| 4,761,458 | 8/1988 | Burns et al. | 528/10 |
| 4,762,895 | 8/1988 | Chandra et al. | 528/474 |
| 4,929,507 | 5/1990 | Nishihara et al. | 528/25 |
| 4,987,201 | 1/1991 | Riccitiello et al. | 528/4 |
| 4,997,899 | 3/1991 | Fujino | 528/9 |
| 5,087,685 | 2/1992 | Sartori et al. | 528/25 |

FOREIGN PATENT DOCUMENTS

| | | |
|---|---|---|
| 037249 | 10/1981 | European Pat. Off. . |
| 315177 | 5/1989 | European Pat. Off. . |
| 375994 | 7/1990 | European Pat. Off. . |
| 3841598 | 6/1989 | Fed. Rep. of Germany . |

OTHER PUBLICATIONS

Yajima et al., "Synthesis of Polytitanocarbosilane and Its Conversion Into Inorganic Compounds," *J. Materials Sci.*, 16(1981), 1349–1355.

Yamamura, "Development of High Tensile Strength Si–Ti–C Fiber Using An Organometallic Polymer Precursor", *Polym. Prepr.*, 25(1984), 8–9.

*Primary Examiner*—Melvyn I. Marquis
*Attorney, Agent, or Firm*—Foley & Lardner

[57] ABSTRACT

Polycarbosilanes in which some of the silicon atoms have been replaced by a hetero element selected from boron, titanium, zirconium, hafnium, etc. The hetero elements are incorporated into the polycarbosilane skeleton in such a way that, like the silicon atoms, they are bonded to the other parts of the polycarbosilanes via hydrocarbon bridges, and the polycarbosilanes are free of hetero element-oxygen-silicon bonds.

19 Claims, No Drawings

POLYCARBOSILANES CONTAINING A HETERO ELEMENT

BACKGROUND OF THE INVENTION

The present invention relates to polycarbosilanes containing a hetero element and to a process for preparing these hetero element-containing polycarbosilanes.

It is known in the prior art that polycarbosilanes and polycarbosilane derivatives can be used, inter alia, as polymer precursors for producing ceramic fibers by the so-called polymer precursor method. The polycarbosilane polymers are first prepared for this purpose. Such polycarbosilanes are polymers having a skeleton structure consisting of the elements carbon and silicon, the polymers being composed of a skeleton having a backbone of (—Si—CH$_2$—) units, in which two side chain groups are bonded to every Si atom. The polycarbosilanes are then spun, for example, to give polymer fibers, which can be converted into a ceramic SiC fibers (for example Nicalon) by pyrolysis processes in a non-oxidizing atmosphere. To be useful as precursors for pyrolytic preparation of a ceramic fiber, it must be possible to convert the polycarbosilanes into the ceramic fiber with high yields while maintaining the original polymer morphology, i.e. while maintaining a fiber form of which the polymer is a model. Often, however, instead of the desired SiC formation, melting processes, decomposition reactions which form large volatile molecules, shrinking processes, and weight loss are also observed to a greater or lesser degree during production of the fibers, depending on the nature of the polycarbosilane employed. The properties of the resulting SiC products are adversely influenced by such side reactions, and therefore the products often prove to be unusable.

In order to counteract the aforementioned disadvantages, in the prior art on the one hand hetero atom compounds, such as, for example, polyborodiphenylsiloxane (PBDPSO) and polymetallo-siloxanes, i.e. hetero element compounds which contain metalloxane units —Mt—O—(Mt=metal, for example Ti or Zr) and siloxane units —Si—O—, are added to the polycarbosilanes as sintering aids during pyrolysis to produce fibers. On the other hand, hetero elements such as, for example, B, Ti, Zr, Cr, Mo and others, are incorporated into the polycarbosilane skeleton as metalloxane units —Mt—O—. These polymetallocarbosilanes of the prior art are thus derived from polycarbosilanes, the main backbone chain of which is essentially formed from structural units —Si—CH$_2$— and metalloxane units —Mt—O—. Polymetallocarbosilanes such as, for example polytitanocarbosilane, are also added to polycarbosilanes as binding and sintering additives for further processing by pyrolysis.

The hetero element in the polymetallocarbosilanes and polymetallocarbosiloxanes, as in polyborodiphenylsiloxane, is always bonded to the silicon atoms of the polycarbosilane via oxygen atoms. Consequently, only ceramic fibers which likewise necessarily always contain oxygen can be prepared from these polycarbosilane derivatives containing a hetero element. However, to improve the properties of the ceramic fibers, it is often desirable to adjust the content of oxygen in the ceramic fiber to as low a value as possible. There is therefore a need for polycarbosilanes which contain a hetero element without any oxygen, so that the hetero element is incorporated into the polycarbosilane skeleton without oxygen bridges.

SUMMARY OF THE INVENTION

It is therefore the object of the invention to provide new polycarbosilanes containing a hetero element which avoid the disadvantages of the prior art.

It is also an object of the invention to provide new polycarbosilanes containing a hetero element which are oxygen-free.

A further object of the invention is to provide new polycarbosilanes containing a hetero element incorporated into the polycarbosilane skeleton by replacing silicon atoms with the hetero element.

These and other objects of the invention are achieved by providing a polycarbosilane containing a hetero element and composed of structural units corresponding to the formulas I and II

wherein

R$^1$ represents hydrogen, alkyl, cycloalkyl, arylalkyl or aryl, whereby R$^1$ may have different meanings in various units of the same polycarbosilane;

R$^2$ represents alkyl, cycloalkyl, arylalkyl or aryl, whereby R$^2$ may have different meanings in various units of the same polycarbosilane;

A represents a straight-chain or branched alkylene group or an arylene group, whereby A may have different meanings in various units of the same polycarbosilane;

M represents a hetero element having a formal valence m = 2, 3, 4 or 5 selected from the group consisting of B, Al, Ga, Ge, Sn, Pb, P, As, Sb, Se, Te, Ti Zr, Hf, V, Nb, Ta, Cr, Mo, W, Mn, Ni, Pd and Pt;

(R$^i$)$_k$ represents a number k=0, 1, 2 or 3 of identical or different groups selected from the group consisting of alkyl, phenyl, cyclopentadienyl and cyclooctadienyl, and l represents the number of groups A having the above meaning bonded to the hetero element M in the structural unit of the formula II, and has the value 1, 2, 3 or 4;

with the proviso that m=k+l+1.

According to a further aspect of the invention, the objects are fulfilled by providing a process for preparing a polycarbosilane as defined above containing a hetero element comprising co-condensing a dihalogenohetero element compound with at least one dihalogenosilane and at least one dihalogenohydrocarbon in the presence of an alkali metal or magnesium, the dihalogenosilane being selected from compounds corresponding to the formula V

wherein
- $R^1$ represents hydrogen, alkyl, cycloalkyl, arylalkyl or aryl,
- $R^2$ represents alkyl, cycloalkyl, arylalkyl or aryl, and
- X represents chlorine or bromine, said dihalogenohydrocarbon being selected from compounds of the formula VI $$Y-A-Y \qquad (VI)$$

wherein
- A represents a straight-chain or branched alkylene group or an arylene group, and
- Y represents chlorine, bromine or iodine, and said dihalogeno-hetero atom compound being selected from compounds of the formula VII

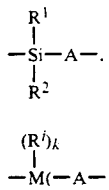
$$(VII)$$

wherein
- M represents a hetero element having a formal valence m = 2, 3, 4 or 5 selected from the group consisting of B, Al, Ga, Ge, Sn, Pb, P, As, Sb, Se, Te, Ti, Zr, Hf, V, Nb, Ta, Cr, Mo, W, Mn, Ni, Pd and Pt,
- $(R^j)_k$ represents a number k = 0, 1, 2 or 3 of identical or different groups selected from the group consisting of alkyl, phenyl, cyclopentadienyl and cyclooctadienyl,
- Z represents chlorine, bromine or iodine, and l is 1, 2, 3 or 4, with the proviso that $m = k + l + 1$.

DETAILED DESCRIPTION OF PREFERRED EMBODIMENTS

The invention thus proposes new polycarbosilanes which contain hetero elements and are based on structural units of the general formulae I and II $$\begin{array}{c} R^1 \\ | \\ -Si-A-. \\ | \\ R^2 \end{array} \qquad (I)$$

$$\begin{array}{c} (R^j)_k \\ | \\ -M(-A-)_l \end{array} \qquad (II)$$

in which
- $R^1$ represents hydrogen, alkyl, cycloalkyl, arylalkyl or aryl, whereby $R^1$ may have the same or different meanings in different units of the same polycarbosilane;
- $R^2$ represents alkyl, cycloalkyl, arylalkyl or aryl, whereby $R^2$ may have the same or different meanings in different units of the same polycarbosilane;
- A represents a straight-chain or branched alkylene group or an arylene group, whereby A may have different meanings in different units of the same polycarbosilane,
- M represents a hetero element having a formal valence m = 2, 3, 4 or 5 selected from the group consisting of B, Al, Ga, Ge, Sn, Pb, P, As, Sb, Se, Te, Ti, Zr, Hf, V, Nb, Ta, Cr, Mo, W, Mn, Ni, Pd and Pt,
- $(R^j)_k$ represents a number k = 0, 1, 2 or 3 of identical or different groups selected from the group consisting of alkyl, phenyl, cyclopentadienyl and cyclooctadienyl and
- l has the value 1, 2, 3 or 4, and represents the number of groups A having the above meaning bonded to the hetero element M in the structural unit of formula II, with the proviso that $m = k + l + 1$.

Therefore the polycarbosilanes according to the invention also contain, in addition to the polycarbosilane structural units of formula I, hetero element structural units of formula II. As used herein, the term "hetero element" refers to the above-mentioned elements M which can be incorporated into the hetero element polycarbosilane in place of silicon atoms. These hetero elements, like the silicon atoms, are therefore bonded to the other units of the polycarbosilane via alkylene groups or arylene groups A in the skeleton of the hetero element polycarbosilane. The polycarbosilanes according to the invention are oxygen-free and therefore differ in this respect articularly advantageously from the oxygen-containing polycarbosilane compounds of the prior art, such as, for example, the polymetallocarbosilanes which contain the metalloxane units —Mt—O—.

Representative examples of the $M(R^j)^k$ groups contained in the hetero element structural units of formula II which can be present in the hetero element polycarbosilanes according to the invention include:

for the hetero element boron: the ethylboron ($C_2H_5B-$) or phenylboron group (PhB—; Ph = $C_6H_5$ = phenyl);

for the hetero element aluminium: the merhylaluminium ($CH_3Al-$) or ethylaluminium group ($C_2H_5Al-$);

for the hetero element gallium: the methylgallium ($CH_3Ga-$) or ethylgallium group ($C_2H_5Ga-$);

for the hetero element germanium: the dimethylgermanium (($CH_3)_2Ge-$) or methylgermanium group ($CH_3Ge-$);

for the hetero element tin: the dimethyltin (($CH_3)_2Sn-$), methylphenyltin ($CH_3PhSn-$), diphenyltin ($Ph_2Sn-$) or the dicyclopentadienyltin group ($Cp_2Sn-$; $Cp = C_5H_5$ = cyclopentadienyl);

for the hetero element lead: the dimethyllead (($CH_3)_2Pb-$), diethyllead (($C_2H_5)_2Pb-$) or diphenyllead group ($Ph_2Pb-$);

for the hetero element phosphorus: the phenylphosphorus group (PhP—);

for the hetero element arsenic: the trimethylarsenic (($CH_3)_3As-$), dimethylarsenic (($CH_3)_2As-$) or phenylarsenic group (PhAs—);

for the hetero element antimony: the trimethylantimony (($CH_3)_3Sb-$), methylantimony ($CH_3Sb-$), triphenylantimony ($Ph_3Sb-$) or diphenylantimony group ($Ph_2Sb-$);

dicyclopentadienyl-metal groups ($Cp_2M-$) of the hetero elements tin, titanium, zirconium, hafnium, vanadium, niobium, tantalum, chromium, molybdenum and tungsten; and cyclopentadienyl-metal groups (CpM—), such as, for example, the π-cyclopentadienyltitanium (CpTi—), π-cyclopentadienylniobium (CpNb—), π-cyclopentadienyltantalum (CpTa—) or the π-cyclopentadienylnickel group (CpNi—);

niobium groups, such as the trimethylniobium group (($CH_3)_3Nb-$); and for the hetero elements palladium and platinum: the cyclooctadienyl-metal groups $-Pd(\eta^4\text{-}C_8H_{12})$ or $-Pt(\eta^4\text{-}C_8H_{12})$.

In place of the $R^i$ groups mentioned in the example $M(R^i)_k$ groups listed above, other analogous organic groups could be used, if desired. An example of a particular analogous organic group $R^i$ is the trimethylsilylmethyl group $(CH_3)_3Si—CH_2—$. Optionally, the hetero element structural units of formula II may also contain metal groups which carry no organic groups $R^i$, i.e. k may equal zero. Specific examples which may be mentioned in which M groups without $R^i$ groups may also be present include M groups of hetero elements such as, for example, boron, selenium, tellurium, chromium and manganese.

In one preferred embodiment of the hetero element polycarbosilanes according to the invention the hetero element structural units of the formula II include $M(R^i)_k$ groups in which the group $(R^i)_k$ represents 1, 2 or 3 identical $R^i$ groups selected from the group consisting of lower alkyl, phenyl and cyclopentadienyl. As used herein, the term "lower alkyl" refers to a C1- to C4-alkyl group. Methyl or ethyl is particularly preferred.

In another preferred embodiment of the hetero element polycarbosilanes according to the invention the hetero element is selected from the group consisting of B having the valence m=3 and Ti, Zr and Hf each having the valence m4. In particularly preferred embodiments of these hetero element polycarbosilanes, the groups $R^i$ then represent phenyl, in the case of the hetero element boron having the valence m=3, and represent cyclopentadienyl in the case of the hetero elements titanium, zirconium or hafnium having the valence m=4. In preferred hetero element polycarbosilanes, the index 1 in particular represents the value 1. Examples of such preferred $M(R^i)_k$ groups in the hetero element structural units of formula II include, in particular, the phenylboron group and the dicyclopentadienyltitanium, dicyclopentadienylzirconium and dicyclopentadienylhafnium group.

In one embodiment of the invention, the hetero element-containing polycarbosilanes comprise a number of different structural units corresponding to the formulas I and II present side by side. The groups A can differ in both the hetero element structural units of formula II and the carbosilane structural units of formula I. In addition, the carbosilane structural units of formula I can also differ in the substituents $R^1$ and/or $R^2$. The structural units of the formulas I and II which form the hetero element-containing polycarbosilane are usually combinations of not more than three differently substituted Si units and not more than three different A units with a hetero element structural unit.

In an advantageous variant, A has only a single meaning in all the structural units of formulas I and II of the polycarbosilane containing a hetero element. In this case, for example, polycarbosilanes according to the invention are present in which the structural units of formulas I and II are made up from combinations of not more than three differently substituted Si units and one M unit with only one A unit.

In another advantageous variant of the invention, the substituents $R^1$ and $R^2$ in the Si units each have only a single meaning in all the structural units of formula I in the polycarbosilane. In this case, for example, polycarbosilanes are present which contain a hetero element and are made up from structural units of formulas I and II in which all the $R^1R^2Si$ units are identical, i.e. polycarbosilanes according to the invention in which only a single type of $R^1R^2Si$ unit is present, alongside the $(R^i)_kM$ hetero element unit.

In a particularly preferred variant. only a single type of structural unit of each of the formulas I and II is present in the hetero element-containing polycarbosilanes according to the invention. The $R^1R^2Si$ units, the $(R^i)_kM$ hetero element units and the A units are then identical in all corresponding structural units of the polycarbosilane composed of units of formulas I and II.

In one variant of the invention, the group $R^1$ in the Si structural units of formula I in the polycarbosilanes according to the invention can represent hydrogen. In another variant of the polycarbosilanes according to the invention, the groups $R^1$ and/or $R^2$ in the Si structural units of formula I can represent alkyl. As used herein, the term "alkyl" refers to a saturated or unsaturated straight-chain or branched alkyl group which may optionally be further substituted by inert groups. Examples of alkyl include methyl, ethyl, propyl, butyl, pentyl, hexyl, octyl, dodecyl, hexadecyl, isopropyl, isobutyl, tertiary butyl, and allyl. The groups $R^1$ and/or $R^2$ in the Si structural units of formula I of the polycarbosilanes according to the invention can also represent cycloalkyl. As used herein, the term "cycloalkyl" refers to a saturated or unsaturated cyclic alkyl group which may optionally be further substituted by inert groups. Examples of cycloalkyl include cyclopentyl, cyclohexyl, cyclopentenyl, and cyclohexenyl. The groups $R^1$ and/or $R^2$ in the Si structural units of formula I can furthermore also represent aryl. As used herein, the term "aryl" refers to an aromatic hydrocarbon group which is unsubstituted or substituted by inert substituents. Examples of aryl include phenyl, naphthyl, p-diphenyl, and alkylaryl groups, such as tolyl, ethylphenyl or propylphenyl. The groups $R^1$ and/or $R^2$ can furthermore also represent arylalkyl. Examples of arylalkyl groups include phenylmethyl or phenylethyl.

In a preferred variant of the hetero element-containing polycarbosilanes according to the invention composed of structural units corresponding to formulas I and II, the substituent $R^1$ represents hydrogen, lower alkyl or phenyl. In another preferred variant of the polycarbosilanes according to the invention composed of structural units of the formulas I and II, the group $R^2$ also represents lower alkyl or phenyl. In these variants of the invention, lower alkyl groups $R^1$ and/or $R^2$ represent C1- to C4-alkyl groups, in particular methyl, ethyl, propyl or butyl. In the two above-mentioned variants of the hetero element-containing polycarbosilanes composed of structural units of formulas I and II, hydridomethylsilylene groups, hydridoethylsilylene groups, hydridophenylsilylene groups, dimethylsilylene groups, methylphenylsilylene groups or diphenylsilylene groups are then present, for example, as especially preferred $R^1R^2Si$ groups.

In the hetero element-containing polycarbosilanes according to the invention, the bridge unit A, i.e. the structural element which bonds the Si units and hetero element units, can represent a straight-chain or branched alkylene group. C1- to C6-alkylene groups are particularly advantageous. Examples of these include methylene, ethylene, trimethylene, propylene $(=—CH(CH_3)—CH_2—)$, tetramethylene, pentamethylene or hexamethylene. Lower alkylene groups, such as methylene, ethylene, trimethylene, and propylene, are particularly preferred. However, a most especially preferred alkylene group A is methylene. In one variant of the invention, the bridge unit A can also be an arylene group. As used herein, the term "arylene groups" is understood to refer to groups such as phenylene (for example p-phenylene, of the formula —C$_6$H$_4$—) or p-phenylenedimethylene groups, such as, for example, —CH$_2$—C$_6$H$_4$—CH$_2$—.

The molar ratio of the structural units of formulas I and II to each other in the hetero element-containing polycarbosilane according to the invention can vary over a wide range such that the amount of hetero element structural unit of the formula II in the polycarbosilane according to the invention may amount to anywhere from small molar proportions, e.g. 1 mole-%, up to 50 mole-%. Preferred hereto element-containing polycarbosilanes of the invention are characterized by a molar ratio of structural units of formula I to those of formula II in the polycarbosilane of from 99:1 to 1:1, particularly in the range from 19:1 to 1:1.

The number of structural units which make up the hetero element-containing polycarbosilanes according to the invention generally may range up to a value of 10,000, preferably up to a value of 100. The polycarbosilanes containing a hetero atom thus have average molecular weights which may range up to 500.000 g/mole.

In one variant of the invention, the polycarbosilanes can also be cross-linked by branching groups corresponding to the formulas III and/or IV

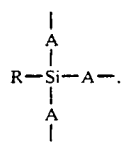
(III)

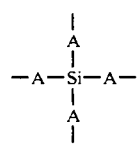
(IV)

wherein

A has the above meaning and

R has the meaning alkyl, cycloalkyl, arylalkyl or aryl given above for R$^2$. Up to 80%, preferably 20 to 50%, of the Si units of formula I in the polycarbosilanes according to the invention can be replaced by the branching groups III and/or IV.

The polycarbosilanes according to the invention which are based on the structural units of formulas I and II can contain various end groups. The end groups can be, for example, on the one hand halogenosilyl groups and/or halogenohydrocarbon groups, or on the other hand chain stopping groups such as trialkylsilyl groups or lower alkyl groups, depending on the preparation. Examples of such end groups include dimethylchlorosilyl, dimethylbromosilyl, phenylmethylchlorosilyl, phenylmethylbromosilyl, diphenylchlorosilyl, diphenylbromosilyl, halogenoalkyl groups such as chloromethyl, bromomethyl, chloroethyl, bromoethyl or chlorocyclohexyl, and chain stopping groups such as trimethylsilyl, diphenylmethylsilyl, triphenylsilyl or methyl or ethyl.

The polycarbosilanes according to the invention are solid or liquid, waxy, amorphous or also crystalline materials having a structure in which essentially each silicon atom and each hetero element is bonded only to carbon atoms. These hetero atom-containing polycarbosilanes are characterized by an Si-Si bond content of not more than 20%, and at most also contain hetero element-hetero element bonds to only a small extent. In the examples according to the invention, the Si-Si bond content is less than 5%.

The invention also relates to a process for preparing polycarbosilanes according to the invention which contain a hetero element and are composed of structural units of the formulas I and II by co-condensation of a dihalogeno-hetero atom compound with at least one dihalogenosilane and at least one dihalogenohydrocarbon in the presence of an alkali metal or magnesium, with optional addition of cross-linking and/or chain stopping reagents, the dihalogenosilanes being chosen from compounds of the formula V

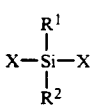
(V)

wherein

R$^1$ represents hydrogen, alkyl, cycloalkyl, arylalkyl or aryl,

R$^2$ represents alkyl, cycloalkyl, arylalkyl or aryl, and

X represents the halogens chlorine or bromine, the dihalogenohydrocarbons being chosen from compounds of the formula VI

Y—A—Y (VI)

wherein

A represents a straight-chain or branched alkylene group or an arylene group and Y represents the halogens chlorine, bromine or iodine, preferably chlorine or bromine, and the dihalogeno-hetero atom compound being chosen from compounds of the formula VII

(VII)

wherein

M represents a hetero element having a formal valence m = 2, 3, 4 or 5 selected from the group consisting of B, Al, Ga, Ge, Sn, Pb, P, As, Sb, Se, Te, Ti, Zr, Hf, V, Nb, Ta, Cr, Mo, W, Mn, Ni, Pd and Pt, (R$^j$)$_k$ represents a number k=0,1, 2 or 3 of identical or different groups selected from the group consisting of alkyl, phenyl, cyclopentadienyl and cyclooctadienyl, Z represents the a halogen selected from the group consisting of chlorine, bromine, and iodine, preferably chlorine or bromine, and l is 1, 2, 3 or 4, with the proviso that m=k+l+1.

Two process variants are thus available for preparing polycarbosilanes according to the invention which contain a hetero element. In process variant a), the educts of formulas V, VI and VII are reacted in an organometallic condensation reaction in the presence of an alkali metal to give hetero element-containing polycarbosilanes according to the invention. In process variant b), on the other hand, the educts of the formulas V, VI and VII are reacted in a Grignard reaction in the presence of magnesium to give the hetero atom-containing polycarbosilanes of the invention.

Hetero element compounds of the formula VII which contain a halogen atom and in which $R^j$, M, Z, k and l have the above meanings are employed in both process variants a) and b). Some representative examples of such hetero element compounds of formula VII which are suitable for carrying out the process according to the invention include: boron trichloride ($BCl_3$: ) or organic boron halides such as ethylboron dichloride ($C_2H_5BCL_2$), phenylboron dichloride ($PhBCL_2$; $Ph=C_6H_5=$phenyl) or phenylboron diiodide ($PhBI_2$); halogen-containing aluminiumalkyls such as methylaluminium dichloride ($CH_3AlCl_2$) or ethylaluminium dichloride ($C_2H_5AlCl_2$); halogen-containing galliumalkyls such as methylgallium dichloride ($CH_3GaCl_2$) or ethylgallium dichloride ($C_2H_5GaCl_2$), or also trimethylsilylmethylgallium dichloride (($CH_3)_3SiCH_2GaCl_2$); halogen-containing alkylgermaniums such as dimethylgermanium dichloride (($CH_3)_2GeCl_2$) or methylgermanium trichloride ($CH_3GeCl_3$); tin compounds such as dimethyltin dichloride (($CH_3)_2SnCl_2$), methylphenyltin dichloride ($CH_3PhSnCl_2$), or diphenyltin dichloride ($Ph_2SnCl_2$); lead compounds such as dimethyllead dichloride (($CH_3)_2PbCl_2$), diethyllead dichloride (($C_2H_5)_2PbCl_2$), or diphenyllead dichloride ($Ph_2PbCl_2$); phosphorus compounds such as phenylphosphorus dichloride ($PhPCl_2$), phosphorus trichloride ($PCl_3$), or phosphorus pentachloride ($PCl_5$); arsenic compounds such as trimethylarsenic dichloride (($CH_3)_3AsCl_2$), dimethylarsenic trichloride (($CH_3)_2AsCl_3$), or phenylarsenic dichloride ($PhAsCl_2$); antimony compounds such as trimethylantimony dichloride (($CH_3)_3SbCl_2$), methylantimony dichloride ($CH_3SbCl_2$) or triphenylantimony dichloride ($Ph_3SbCl_2$); selenium dichloride ($SeCl_2$); tellurium dichloride ($TeCl_2$); di-$\pi$-cyclopentadienyl-metal dichlorides of the formula $Cp_2MZ_2$ ($Cp=C_5H_5=$cyclopentadienyl; Z having the above meaning) of the hetero elements (M) tin, titanium, zirconium, hafnium, vanadium, niobium, tantalum, chromium, molybdenum and tungsten; as well as cyclopentadienyl compounds such as $\pi$-cyclopentadienyl-titanium trichloride ($CpTiCl_3$), $\pi$-cyclopentadienyl-niobium tetrachloride ($CpNbCl_4$) or $\pi$-cyclopentadienyl-tantalum tetrachloride ($CpTaCl_4$); niobium compounds such as trimethylniobium dichloride (($CH_3)_3NbCl_2$); chromium halides such as chromium dichloride ($CrCl_2$), or chromium trichloride ($CrCl_3$); manganese dichloride ($MnCl_2$); nickel dichloride ($NiCl_2$); and platinum compounds such as dichlorocyclooctadienyl compounds of palladium ($PdCl_2(\eta^4$-$C_8H_{12})$) and platinum ($PtCl_2(\eta^4$-$C_8H_{12})$). Instead of the aforementioned chlorides, the corresponding bromides or iodides of the hetero element compounds can also be employed. Phenylboron dichloride and the cyclopentadienyl complex compounds di-$\pi$-cyclopentadienyl-titanium dichloride, di-$\pi$-cyclopentadienyl-zirconium dichloride and di-$\pi$-cyclopentadienyl-hafnium dichloride are particularly suitable as hetero element compounds for the process of the invention for preparing the hetero element polycarbosilanes according to the invention.

The hetero element compounds of formula VII employed in the process according to the invention are known and are either commercially obtainable or can easily be prepared by known processes. Since the availability of the hetero element compounds of formula VII which are employed thus presents no problem to a person of ordinary skill in the art, their preparation will merely be outlined briefly here with reference to a few, typical, representative examples. Thus, for example, alkyl-substituted hetero element compounds can be prepared from the corresponding hetero element halides by transalkylation reactions with, for example, aluminium trialkyls. For example ethylboron dichloride can be formed by reacting triethyl aluminium with boron trichloride and can then easily be isolated from the reaction mixture by distillation. Phenyl-substituted hetero element compounds can be prepared analogously to the alkyl-substituted hetero element compounds. Thus, for example, phenylboron dichloride can be obtained by reaction of tetraphenyltin with boron trichloride, phenyltin trichloride being obtained as a further product. Phenylboron dichloride can be isolated by distillation from the reaction mixture. Cyclopentadienyl-substituted heteroelement compounds can be prepared in a simple manner by reacting the metal chlorides on which they are based (for example $MCl_4$) with cyclopentadienylsodium or cyclopentadienyllithium ($NaC_5H_5$ or $LiC_5H_5$) or with dicyclopentadienylmagnesium ($Mg(C_5H_5)_2$), and, after the solvent used for the reaction (usually xylene or tetrahydrofuran) has been distilled off, can be isolated from the solid residue which remains by solvent extraction (for example with chloroform). This process has proved to be particularly suitable for preparing di-$\pi$-cyclopentadienyl dichlorides of the hetero elements titanium, zirconium and hafnium. Other di-$\pi$-cyclopentadienyl dihalides, e.g. the bromides or iodides, of these hetero elements can be prepared, for example, from the above-mentioned chlorides by transhalogenation with boron tribromide or boron triiodide. The transfer of cyclopentadienyl groups from dicyclopentadienyl magnesium to the chlorides of the hetero elements, for example titanium tetrachloride, which is controlled by the molar amounts, can vary the number of cyclopentadienyl groups in the hetero element compounds of formula VII to deviate from the number two; for example, $\pi$-cyclopentadienyl-titanium trichloride can be prepared in this way. The number of cyclopentadienyl groups can also be varied by ligand synproportionation; for example, $\pi$-cyclopentadienyltitanium trichloride is also obtained by reacting dicyclopentadienyl-titanium dichloride with titanium tetrachloride. With cyclopentadienyl-substituted hetero element compounds having the formal valence m=5, the di-$\pi$-cyclopentadienyl-hetero element dichlorides can be prepared as described below, for example, for niobium. Thus, dicyclopentadienylniobium dichloride can be prepared from niobium pentachloride and cyclopentadienylsodium in a one-pot process via a $\mu$-oxo complex having the composition [{NbCl($\eta$-$C_5H_5)_2\}_2O]Cl_2$, which is subsequently converted into the product by reduction with tin dichloride. In the case of palladium, for example, cyclopentadienyl-substituted hetero element compounds of formula VII can be obtained by reacting cyclooctadiene with palladium dichloride, which has first been dissolved in concentrated hydrochloric acid and then diluted in ethanol. In the case of platinum, the cyclooctadiene is prepared, for example, with dipotassium tetrachloroplatinate ($K_2[PtCl_4]$).

Known dihalogenosilanes of the formula V in which $R^1$, $R^2$ and X have the above meanings are employed as the second reaction component in both process variants a) and b). Examples of such dihalogenosilanes which are suitable for carrying out the process according to the invention include dihalogenosilanes of formula V, particularly dichloro- or dibromosilanes, in which $R^1$ is hydrogen and $R^2$ represents alkyl, cycloalkyl, arylalkyl or aryl, or dihalogenosilanes of the formula IV in which $R^1$ and/or $R^2$ represents alkyl, cycloalkyl, arylalkyl or aryl. The groups alkyl, cycloalkyl, arylalkyl and aryl here have the meanings given above in the description of the hetero element-containing polycarbosilanes according to the invention. In preferred embodiments of the process, $R^1$ on the one hand is hydrogen, lower alkyl having 1 to 4 carbon atoms, i.e. methyl, ethyl, propyl or butyl, or phenyl, and $R^2$ is likewise lower alkyl having the above meaning or phenyl. Representative examples of such dihalogenosilanes which are particularly suitable for carrying out the process according to the invention include hydridomethylsilyl dichloride, hydridoethyldichlorosilane, hydridophenyldichlorosilane, dimethyldichlorosilane, diethyldichlorosilane, methylphenyldichlorosilane and diphenyldichlorosilane, as well as the corresponding dibromosilanes.

The third reaction component employed in the two process variants a) and b) is a known dihalogenohydrocarbon corresponding to the formula VI in which A and Y have the above meanings. Thus, A can represent a straight-chain or branched alkylene group. Advantageous groups are C1- to C6-alkylene groups, particularly the C1- to C3-alkylene groups methylene, ethylene, trimethylene or propylene. Dihalogenohydrocarbons which are particularly suitable for the process of the invention include diiodo-, dibromo- or dichlorohydrocarbons. Examples of suitable dihalogenohydrocarbons include methylene chloride, methylene bromide, 1,2-dichloroethane, 1,2-dibromoethane, 1,3-dichloropropane, 1,3-dibromopropane, 1,3-diiodopropane and 1,2-dibromopropane. In one variant of the invention, the dihalogenohydrocarbon of formula VI can also be an aromatic dihalogenohydrocarbon. Such aromatic dihalogenohydrocarbons can be, for example, dihalogenobenzene or dihalogenoxylene derivatives, such as, in particular, p-dibromobenzene ($Br—C_6H_4—Br$) or p-di-(bromomethyl)-benzene ($BrCH_2—C_6H_4—CH_2Br$) [dibromoxylene].

According to the invention, to prepare polycarbosilanes composed of structural units of formulas I and II, the hetero element compound of the formula VII is reacted with at least one dihalogenosilane of formula V and with at least one dihalogenohydrocarbon of formula VI in the presence of an alkali metal or magnesium. The process of the invention thus provides a simple and generally applicable method for convenient preparation of the hetero element-containing polycarbosilanes of the invention which are composed of structural units of formulas I and II. The process of the invention makes it possible, by varying the nature and number of reactants employed (i.e. the hetero element compound employed, the dihalogenosilane employed, and the dihalogenohydro-carbon employed) to prepare a large number of interesting and previously inaccessible polycarbosilanes which contain a hetero element and are composed of structural units of formulas I and II.

In one variant of the process according to the invention, the hetero element compound of the formula VII is reacted with mixtures of differently substituted dihalogenosilanes of formula V and with mixtures of dihalogenohydrocarbons of formula VI with differing groups A. The reaction of a hetero element compound with dihalogenosilane mixtures and with dihalogenohydrocarbon mixtures thus gives, for example, hetero element-containing polycarbosilanes according to the invention in which various structural units of formula I, which can differ independently of one another in the substituents $R^1$ and/or $R^2$ and/or the groups A, depending on the chosen type and number of the reactants used, exist side by side. Furthermore, the groups A in various structural units of formula II of the hetero atom-containing polycarbosilanes of the invention can then also differ. However, the hetero element compound of the formula VII is usually reacted simultaneously with not more than 3 different dihalogenosilanes and with not more than 3 different dihalogenohydrocarbons. It is particularly advantageous to react the hetero element compound with mixtures of not more than 3 different dihalogenosilanes and with only one dihalogenohydrocarbon. Another advantageous variant is to react the hetero element compound with only one dihalogenosilane and a mixture of at most 3 different dihalogenohydrocarbons. The amount of dihalogenosilanes or mixtures thereof employed in relation to the amount of hetero element compound employed can vary over a wide range from only small proportions of hetero element compound up to 50 mole % (based on the sum of dihalogenosilane and hetero element compound). The amounts of dihalogenosilanes and hetero element compound are preferably selected so that the molar ratio of all the dihalogenosilanes of formula V to the hetero element compound of formula VII is 99:1 to 1:1, preferably from 19:1 to 1:1. The amounts of dihalogenosilane and hetero element compound employed on the one hand and of dihalogenohydrocarbon employed on the other hand are preferably chosen so that in total a molar ratio of the sum of dihalogenosilanes and hetero element compound on the one hand to the dihalogenohydrocarbons on the other hand of about 1:1 is present. In general, however, deviations of up to 20% from this molar ratio are also possible.

In preferred embodiments of the two process variants a) and b) according to the invention, the hetero element compound of formula VII is reacted with only a single dihalogenosilane of formula V and with only a single dihalogenohydrocarbon of formula VI. Very uniform chain-like polycarbosilanes which contain a hetero element are obtained by this process variant; the groups $R^1$ and $R^2$ in all the structural units of formula I of this polycarbosilane and the group A in all the structural units of formulas I and II of this polycarbosilane each having only a single meaning. The molar ratio of the three reactants (dihalogenosilane, hetero element compound and dihalogenohydrocarbon) in this process variant is preferably about (2-n):n:2, where n is the molar amount of hetero element compound employed and can assume a value of up to 1. Values of n from 0.1 to 1 are preferred. However, deviations from the molar ratio mentioned in respect of the sum of dihalogenosilane and hetero element compound on the one hand and the dihalogenohydrocarbon on the other hand of up to 20% are also possible.

In another embodiment of process variants a) and b) according to the invention, it is possible, if desired, to effect additional controlled crosslinking of the linear polycarbosilane chains based on the general structural units of formulas I and II. Up to 50 mole % of the dihalogenosilane V employed, depending on the desired degree of crosslinking, is then replaced by a trihalogenosilane of the $RSiX_3$, in which X represents halogen, preferably chlorine or bromine, and R represents alkyl, cycloalkyl, arylalkyl or aryl as defined above for $R^2$. The trihalogenosilane $RSiX_3$ can either already be admixed to the reaction mixture at the start of the reaction, or it can also be added dropwise to or introduced into the reactant mixture later in the course of the reaction. Examples of trihalogenosilanes $RSiX_3$ which can be used include trichlorosilane, methyltribromosilane, methyltrichlorosilane or phenyltrichlorosilane. Crosslinked hetero element-containing polycarbosilanes which are based on structural elements of formulas I and II and additionally contain branching groups of formula III are obtained by this process variant.

In another embodiment of process variants a) and b), crosslinking of the linear polycarbosilane chains which contain a hetero element and are based on the structural formulas I and II can furthermore be achieved by adding tetrahalogenosilanes, such as tetrachlorosilane or tetrabromosilane. Hetero element containing crosslinked polycarbosilanes which are composed of structural units of formulas I and II and which additionally contain branching groups of formula IV are then obtained.

In another embodiment of the process, the degree of condensation of the hetero element-containing chain-like or crosslinked polycarbosilanes to be prepared composed of structural units of formulas I and II can moreover be controlled by stopping the condensation by addition of condensation-stopping reagents. Monohalogenosilanes $R'_3SiX$, in which X represents halogen, preferably chlorine or bromine, and $R'$ represents alkyl, cycloalkyl, arylalkyl or aryl as defined above for $R^2$, are suitable reagents for stopping the condensation reaction. Other suitable reagents for stopping the condensation reaction include monohalogenohydrocarbons $R''Y$, in which Y represents iodine, bromine or chlorine and $R''$ represents alkyl or cycloalkyl. Examples of suitable monohalogenosilanes include trimethylchlorosilane, trimethylbromosilane and diphenylmethylchlorosilane. Examples of suitable monohalogenohydrocarbons include methyl bromide or methyl chloride.

The nature of the end groups present in the hetero element-containing polycarbosilanes prepared by the process of the invention depends on whether the process is carried out with or without chain stopping reagents. The end groups already described above in connection with the polycarbosilanes according to the invention are obtained.

While the above statements apply both to the process for preparing hetero element-containing polycarbosilanes in the presence of an alkali metal (variant a) and to the preparation of the polycarbosilane by Grignard condensation in the presence of magnesium (variant b), some peculiarities of the two process variants a) and b) will also be described separately below.

In process variant a) for preparing polycarbosilanes which contain a hetero element and are based on structural units of formulas I and II, the hetero element compound of formula VII, dihalogenosilanes of formula V, and dihalogenohydrocarbons of formula VI are reacted with one another in the presence of an alkali metal in an inert organic liquid medium.

The alkali metal which can be used in process variant a) according to the invention can be, for example, lithium, sodium or potassium. The preferred alkali metal is sodium since this generally gives the highest yields of polycarbosilanes and leads the least to side reactions. To assure complete reaction, it is preferable to use a small excess of alkali metal. The amount of alkali metal to be used is about 2.2 moles per mole of all the dihalogeno compounds employed. For example, about 4.4 moles of alkali metal are required for reacting 0.5 mole of hetero element compound, 0.5 mole of dihalogenosilane, and 1 mole of dihalogenohydrocarbon.

The organic liquid medium for process variant a) in which the reaction takes place can be any desired solvent which is compatible with alkali metals and in which the hetero element compounds, dihalogenosilanes and dihalogenohydrocarbons used as reactants are soluble. This organic liquid medium is preferably also a solvent for the polycarbosilanes to be prepared by the process according to the invention. Suitable solvents can be, for example, hydrocarbons such as toluene, xylene or paraffins, ethers such as tetrahydrofuran, dioxane or dibutyl ether, alkylene glycol ethers, for example ethylene glycol ethers such as diethylene glycol dialkyl ethers, propylene glycol ethers, polyethylene glycol ethers or polypropylene glycol ethers, and also nitrogen-containing solvents, such as ethylenediamine or mixtures thereof. Solvents which have boiling points above the melting point of the alkali metal employed are advantageously used. A preferred solvent is xylene. The amount of solvent can be varied over a wide range. The use of large amounts of solvent leads, for example, to polycarbosilanes of low molecular weight. The alkali metal halides obtained in the reaction are usually insoluble and can therefore easily be removed by filtration.

Process variant a) can be carried out within wide temperature ranges, but the reaction temperature is preferably kept at temperatures of about 10° to 180° C. The reaction proceeds exothermically and is preferably started at the melting point of the alkali metal employed, for example at about 100° C. if sodium is used. No external supply of heat is necessary during the reaction. If the reaction proceeds too vigorously, the mixture can optionally be cooled. However, in principle cooling is not essential. Furthermore, the reaction is generally carried out under a suitable inert gas such as, for example, nitrogen or argon.

The reaction according to process variant a) generally is carried out by first producing a suspension of the alkali metal in the solvent. A preferred solvent for preparing the suspension is a hydrocarbon such as xylene or decalin, into which the alkali metal is introduced in the form of small pieces and which is subsequently heated to temperatures above the melting point of the alkali metal, while stirring intensively. The resulting alkali metal suspension can be used either after cooling or directly for the further reaction. For this, the other reactants (hetero element compound, dihalogenosilanes, dihalogenohydrocarbons) are introduced into the alkali metal suspension. This is effected either by simultaneous dropwise addition of the reactants to the metal suspension or by simultaneously introducing the reactants directly into the metal suspension. It has proved to be particularly advantageous if the reactants are already mixed with one another, and optionally diluted with a suitable solvent, before being introduced.

When the reaction has been carried out, the polycarbosilane can be isolated from the reaction mixture of process variant a) by any suitable method. If the polycarbosilane is soluble in the solvent, the other insoluble components can be removed by filtration. The polycarbosilane which remains in the solvent can be purified by washing with water and drying to a powder by removing the solvent. If excess alkali metal has been used, this is solvolysed with a suitable alcohol in a known manner before isolation of the polycarbosilane. Depending on the alkali metal used, suitable alcohols include methanol, ethanol, isopropanol or tertiary butanol. The resulting alkali metal alcoholates are then decomposed further by adding water, and the alkali metal salts which precipitate are removed by filtration. However, if the polycarbosilanes formed are insoluble in the solvent, they can be extracted by another suitable solvent, subsequently purified by washing with water and dried to a powder by removing the solvent.

In process variant b), for preparation of polycarbosilanes which contain a hetero element and are based on structural units of formulas I and II, the hetero element compound of formula VII, dihalogenosilanes of formula V and dihalogenohydrocarbons of formula VI are reacted with one another in a Grignard polycondensation in the presence of magnesium and in the presence of an organic solvent which is suitable for Grignard reactions.

The magnesium employed in process variant b) according to the invention is used as a metal in the form of magnesium powder, magnesium filings, magnesium grit, or the like. The magnesium metal can preferably be pretreated for use in the Grignard reaction by known measures before being used. For example, it is advisable to degrease the magnesium before the reaction and to free it from adhering moisture by drying, or optionally to etch it slightly with small amounts of lower hydrocarbons containing bromine or iodine. such as dibromomethane, dibromopropane, diiodopropane and the like, but preferably with elemental iodine. The amount of magnesium metal to be used is about 2 moles, based on the sum of hetero element compound and dihalogenosilane employed on the one hand and the dibromohydrocarbon employed on the other hand. The sum of the amounts of hetero element compound and dihalogenosilane is preferably employed in the reaction according to process variant b) in an approximately equimolar amount relative to the dihalogenohydrocarbon.

The organic solvent in which the Grignard polycondensation reaction (process variant b); takes place can be any desired dry solvent which is compatible with Grignard reagents, in particular an ether, such as diethyl ether, dioxane, tetrahydrofuran and the like.

The Grignard polycondensation reaction according to the invention (process variant b)) is generally carried out, for example, by first introducing the hetero element compound and dihalogenosilane into the reaction vessel with the magnesium in the solvent, preferably in ether or tetrahydrofuran. The dihalogenohydrocarbon (preferably the bromine derivative) is then added dropwise until the reaction starts, and the exothermic reaction is controlled by adjusting the rate of dropwise addition of dihalogenohydrocarbon such that uniform boiling takes place. For good results, dry reaction conditions should be maintained, and the reaction should be carried out under an inert gas atmosphere, while stirring. Suitable inert gases include, for example, nitrogen or noble gases such as argon. The temperature which is established during the reaction depends on the boiling point of the solvent used. After the end of the exothermic reaction, the reaction mixture is usually further stirred at room temperature for a relatively long period of time to assure that complete reaction has taken place. The reaction is typically carried out over a period of 1 to 48 hours. A known procedure for working up Grignard reaction mixtures can be followed to work up the reaction mixture and isolate the polycarbosilane formed. For example, residues of unreacted Grignard reagents are decomposed by adding or pouring into water, hydrochloric acid, aqueous ammonium chloride solution, or the like, and the solvent containing dissolved polycarbosilane is separated from the aqueous phase or optionally the polycarbosilane is extracted from the reaction mixture with a suitable organic solvent, for example a halogenated hydrocarbon such as methylene chloride, chloroform, carbon tetrachloride or fluorochlorohydrocarbons, and isolated in solid form in a known manner by removing the solvent.

The above process variants according to the invention enable polycarbosilanes which contain a hetero element to be prepared in an advantageous manner directly from monomeric hetero element compounds, dihalogenosilanes and dihalogenohydrocarbons. In contrast to the prior art, it is thus not necessary to take any circuitous route via polysilanes and/or polycarbosilanes, into which the hetero element has to be introduced subsequently by pyrolytic procedures using oxygen-containing hetero element compounds (for example polyborodiphenylsiloxane, titanium tetraalkoxides, aluminium trialkoxides, zirconium tetracetylacetonate and the like). While in the processes of the prior art hetero element-oxygen-silicon bonds are usually formed by pyrolytic processes, i.e. with no possibility at all of controlling the type and rate of incorporation, the process according to the invention for preparing polycarbosilanes which contain a hetero element is a very gentle process which enables these polycarbosilanes according to the invention to be prepared in a high purity. The process according to the invention moreover makes it possible to prepare new, previously inaccessible, oxygen-free polycarbosilanes containing a hetero element. The absence of oxygen from the hetero element-containing polycarbosilanes according to the invention is of particular advantage, especially with regard to subsequent thermal conversion into ceramic products. The thermal conversion of oxygen-containing polycarbosilane precursors into ceramic products as a rule takes place with the formation of silicon dioxide and metal oxides and with high weight losses, and leads to poorer material properties of the resulting ceramic products. In contrast, the hetero element-containing polycarbosilanes according to the invention are suitable as useful starting polymers (precursors) for producing industrially high quality silicon carbide ceramic products (for example fibers and the like) and are also outstandingly suitable for various other industrial uses, for example as sintering additives, surface impregnating agents, binders or coating materials.

The invention will be described in further detail below with reference to examples, which are not limiting on the scope of the invention. Unless otherwise indicated, all parts and percentages in the examples refer to parts by weight or weight percent. All the reactions were carried out in standard laboratory apparatus and, where necessary, under an inert gas atmosphere of nitrogen.

EXAMPLE 1

A mixture of 0.15 mole of dichlorodiphenylsilane (38 g; 31.54 ml), 0.167 mole of methylene bromide (29 g; 11.7 ml) and 0.017 mole of dichlorophenylborane (2.7 g; 2.25 ml) was added dropwise to a suspension of 0.75 mole (17.25 g) of sodium in 250 ml of xylene at a temperature of 138° C. The dropwise addition time was one hour. After a postreaction time of one more hour, the cooled solution was filtered, under an inert gas, and the residue was washed several times with xylene until free from polycarbosilane. The solvent of the combined xylene extracts was distilled on a rotary evaporator, and the isolated polycarbosilane dried under a high vacuum at 100° C.

The yield of solid yellow polycarbosilane was 30.5 g (98%). Elemental analysis showed 13.4% Si; 80% C; 6.21% H, and 0.35% of B. Typical polyphenylcarbosilane bands could be identified in the IR spectrum. The characteristic B-C vibration could be detected at 1350 cm$^{-1}$. The $^1$H-NMR spectrum showed peaks at 7.9 ppm (phenyl-B); 7.3 ppm (phenyl-Si) and 0–2.3 ppm (CH$_2$). The $^{11}$B-NMR spectrum showed a broad signal at about 30 ppm.

EXAMPLE 2

The experiment was carried out analogously to Example 1. The amounts in the mixture were 0.076 mole of Ph$_2$SiCl$_2$ (19.24 g; 15.98 ml); 0.151 mole of CH$_2$Br$_2$ (26.25 g; 10.54 ml) and 0.076 mole of PhBCl$_2$ (12.07 g; 10.04 ml).

The boron-containing polycarbosilane, isolated in a yield of 88% (19.9 g), was a black-brown, highly viscous product. Elemental analysis showed: 10% Si; 75.9% C; 6.2% H and 2.5% of B. The IR spectrum showed the expected increase in intensity of the B-C vibration band at 1350 cm$^{-1}$. The data from the $^1$H-NMR spectrum were: 7.6–8.3 ppm (phenyl-B); 6.3–7.7 ppm (phenyl-Si), and 0.3 ppm (CH$_2$). In the $^{11}$B-NMR spectrum, the B peak was found at about 30 ppm.

EXAMPLE 3

The experiment was carried out analogously to Example 1. The amounts of substance employed were: 0.076 mole of dichlorodimethylsilane (9.81 g; 9.22 ml); 0.151 mole of methylene bromide (26.25 g; 10.54 ml), and 0.076 mole of dichlorophenylborane (12.07 g; 10.04 ml).

It was possible to isolate a highly viscous, brown polycarbosilane in a yield of 67% (8.9 g). Elemental analysis showed: 16% Si; 69% C; 8.4% H; 3% B. In the IR spectrum, in addition to the characteristic vibration bands of a polymethylcarbosilane, the B-C vibration was found at 1350 cm$^{-1}$. The $^1$H-NMR spectrum showed signals at: 7.6–8.3 ppm (phenyl-B) and 0–3 ppm (CH$_3$, CH$_2$). The boron signal in the $^{11}$B-NMR spectrum was at 30 ppm.

EXAMPLE 4

25.3 g of sodium (1.1 mole) and 12.45 g of titanocene dichloride (0.05 mole) were initially introduced into 350 ml of xylene in a 1 liter three-necked flask with a reflux condenser, overhead stirrer and dropping funnel. A reaction mixture of 43.46 g of methylene bromide (0.25 mole; 17.45 ml) and 50.64 g of diphenyldichlorosilane (0.2 mole; 42.06 ml) was added at 138° C. over the course of one hour, under an inert gas. After a postreaction time of a further hour, the cooled reaction mixture was filtered, the residue was washed several times with xylene, and the solvent was distilled off from the combined xylene extracts in a rotary evaporator. The isolated polycarbosilane was then dried further for several hours at 100° C. under a high vacuum.

The yield of red, hard solid was 85.3% (20.8 g). Elemental analysis showed: 16.1% Si; 75.8% C; 5.1% H; and 2.4% Ti. The IR spectrum showed the vibration bands characteristic of polyphenylcarbosilane structures. The typical absorption bands of the cyclopentadienyl groups were additionally present at 1440, 880 and 820 cm$^{-1}$. The Ti-C vibration was at 520 cm$^{-1}$. In the $^1$H-NMR spectrum, the phenyl proton signals were found in the range of 6.3–7.7 ppm, the cyclopentadienyl proton signals in the range of 5–6.3 ppm, and the alkyl proton signals in the range of 0–3 ppm. The $^{13}$C-NMR spectrum showed three signal ranges: at 0 to 50 ppm (alkyl), at 114 to 117 ppm (cyclopentadienyl), and at 128 to 136 ppm (phenyl).

EXAMPLE 5

0.22 mole of magnesium (5.3 g), 0.066 mole of dichlorodiphenylsilane (16.7 g; 13.7 ml), and 0.033 mole of titanocene dichloride (8.2 g) were initially introduced into 150 ml of diethyl ether in a 1 liter two-necked flask equipped with a reflux condenser and dropping runnel. After gentle heating, a few drops of methylene bromide were introduced until the reaction started. After the reaction had started, 0.1 mole of methylene bromide (17.4 g; 7 ml) was added continuously over the course of one hour. The reaction solution was then stirred at room temperature for a further 16 hours, saturated ammonium chloride was added, the organic phase was separated and filtered, and the solvent was distilled off in a rotary evaporator. The deep red product isolated was dried at 100° C. under a high vacuum for several hours.

The yield was 17.55 g (91%) of polycarbosilane. Elemental analysis showed: 11.7% Si; 70.4% C; 6% H; and 8.4% Ti. The IR spectrum clearly showed vibration bands characteristic of cyclopentadienyl and Ti-C. The $^1$H-NMR and $^{13}$C-NMR spectra corresponded substantially to those of the hetero element polycarbosilane of Example 4.

EXAMPLE 6

0.22 mole of magnesium (5.3 g), 0.066 mole of dichlorodiphenylsilane (16.7 g; 13.7 ml), and 0.033 mole of zirconocene dichloride (9.6 g) were initially introduced into 150 ml of diethyl ether in a 1 liter two-necked flask equipped with a reflux condenser and dropping funnel. After the reaction had started, 0.1 mole of methylene bromide (17.4 g; 7 ml) was continuously added dropwise over the course of one hour. The reaction solution was stirred at room temperature for 15 hours, and saturated ammonium chloride solution was then added. After the organic phase had been separated, it was filtered, and the solvent was then distilled off. The polycarbosilane isolated was dried for 10 hours at 100° C. under a high vacuum.

The yield of solid, red-brown polycarbosilane was 17.4 g (84%). Elemental analysis showed 15% Si; 65.6% C; 5.4% H; and 9.4% of Zr. The IR spectrum clearly showed vibrations characteristic of cyclopentadienyl and Zr-C. The $^1$H— and $^{13}$C—NMR spectra likewise characterized a Zr-containing polycarbosilane.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A polycarbosilane containing a hetero element and composed of structural units corresponding to the formulas I and II

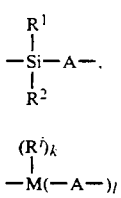

wherein
  $R^1$ represents hydrogen, alkyl, cycloalkyl, arylalkyl or aryl, whereby $R^1$ may have different meanings in various units of the same polycarbosilane;
  $R^2$ represents alkyl, cycloalkyl, arylalkyl or aryl, whereby $R^2$ may have different meanings in various units of the same polycarbosilane;
  A represents a straight-chain or branched alkylene group or an arylene group, whereby A may have different meanings in various units of the same polycarbosilane;
  M represents a hetero element having a formal valence m = 2, 3, 4 or 5 selected from the group consisting of B, Al, Ga, Ge, Sn, Pb, P, As, Sb, Se, Te, Ti, Zr, Hf, V, Nb, Ta, Cr, Mo, W, Mn, Ni, Pd and Pt;
  ($R^i$) represents identical or different groups selected from the group consisting of alkyl, phenyl, cyclopentadienyl and cyclooctadienyl;
  k represents a number 0, 1, 2 or 3; and
  l represents the number of groups A having the above meaning bonded to the hetero element M in the structural unit of the formula II, and has the value 1, 2, 3 or 4;
with the proviso that $m = k + l + 1$.

2. A polycarbosilane according to claim 1, wherein $(R^i)_k$ represents a number k=1, 2 or 3 of identical groups selected from the group consisting of lower alkyl, phenyl and cyclopentadienyl.

3. A polycarbosilane according to claim 1, wherein said hetero element is selected from the group consisting of B having the valence m=3 and Ti, Zr and Hf each having the valence m=4.

4. A polycarbosilane according to claim 3, wherein if M is a hetero element having the valence m=3, $R^i$ represents phenyl, and if M is a hetero element having the valence m=4, $R^i$ represents cyclopentadienyl.

5. A polycarbosilane according to claim 1, wherein l has the value 1.

6. A polycarbosilane according to claim 1, wherein A has the same meaning in all structural units of the polycarbosilane.

7. A polycarbosilane according to claim 6, wherein A represents a C1 to C6-alkylene group.

8. A polycarbosilane according to claim 7, wherein A is selected from the group consisting of methylene, ethylene, trimethylene, and propylene.

9. A polycarbosilane according to claim 1, wherein $R^1$ has the same meaning in all structural units of said polycarbosilane, and $R^2$ has the same meaning in all structural units of said polycarbosilane.

10. A polycarbosilane according to claim 9, wherein $R_1$ represents hydrogen, lower alkyl or phenyl.

11. A polycarbosilane according to claim 9, wherein $R^2$ represents lower alkyl or phenyl.

12. A polycarbosilane according to claim 1, wherein said structural units of formula I and formula II are present in a molar ratio of 99:1 to 1:1.

13. A polycarbosilane according to claim 12, wherein said structural units of formula I and formula I are present in a molar ratio of 19:1 to 1:1.

14. A polycarbosilane according to claim 1, comprising a total number of structural units of formula I and formula II is at most 10,000.

15. A polycarbosilane according to claim 14, wherein the total number of structural units of formula I and formula II is at most 100.

16. A polycarbosilane according to claim 1, which additionally contains branching groups corresponding to at least one of the formulas III or IV

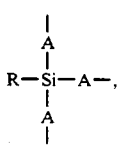

wherein
  A has the meaning given in claim 1, and
  R represents alkyl, cycloalkyl, arylalkyl or aryl.

17. A process for preparing a polycarbosilane according to claim 1, containing a hetero element comprising co-condensing a dihalogeno-hetero element compound with at least one dihalogenosilane and at least one dihalogenohydrocarbon in the presence of an alkali metal or magnesium, said dihalogenosilane being selected from compounds corresponding to the formula V

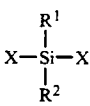

wherein
  $R^1$ represents hydrogen, alkyl, cycloalkyl, arylalkyl or aryl,
  $R^2$ represents alkyl, cycloalkyl, arylalkyl or aryl, and
  X represents chlorine or bromine,
said dihalogenohydrocarbon being selected from compounds of the formula VI

wherein
  A represents a straight-chain or branched alkylene group or an arylene group, and
  Y represents chlorine, bromine or iodine, and
said dihalogeno-hetero atom compound being selected from compounds of the formula VII

(VII)

wherein
- M represents a hetero element having a formal valence m = 2, 3, 4 or 5 selected from the group consisting of B, al, Ga, Ge, Sn, Pb, P, As, Sb, Se, Te, Ti, Zr, Hf, V, Nb, Ta, Cr, Mo, W, Mn, Ni, Pd and Pt,
- ($R^i$) represents identical or different groups selected from the group consisting of alkyl, phenyl, cyclopentadienyl and cyclooctadienyl,
- k represents a number 0, 1, 2 or 3,
- Z represents chlorine, bromine or iodine, and
- l is 1, 2, 3 or 4, with the proviso that m = k + l + 1.

18. A process according to claim 17, wherein said co-condensation step is carried out int he presence of an added cross-linking trihalogenosilane of the formula $RSiX_3$ in which X represents halogen, and R represents alkyl, cycloalkyl, arylalkyl or aryl as defined above for $R^2$, or a chain stopping reagent selected from the group consisting of
- monohalogenosilanes of the formula $R'_3SiX$ in which X has the above meaning and R' represents alkyl, cycloalkyl, arylalkyl or aryl as defined above for $R^2$, and
- monohalogenohydrocarbons R"Y in which R" represents alkyl or cycloalkyl, and Y represents iodine, bromine or chlorine.

19. A process according to claim 17, wherein Y and Z are each independently selected from the group consisting of chlorine and bromine.

* * * * *